United States Patent
Bathurst

(10) Patent No.: US 10,291,387 B2
(45) Date of Patent: May 14, 2019

(54) METHOD FOR CONFIGURING AN INFRARED AUDIO TRANSMISSION SYSTEM AND APPARATUS FOR USING IT

(71) Applicant: TELEVIC CONFERENCE NV, Izegem (BE)

(72) Inventor: M. Tracy Alan Bathurst, South Jordan, UT (US)

(73) Assignee: Televic Conference NV, Izegem (BE)

( * ) Notice: Subject to any disclaimer, the term of this patent is extended or adjusted under 35 U.S.C. 154(b) by 0 days.

(21) Appl. No.: 15/565,153

(22) PCT Filed: Apr. 7, 2016

(86) PCT No.: PCT/US2016/026368
§ 371 (c)(1),
(2) Date: Oct. 7, 2017

(87) PCT Pub. No.: WO2016/164538
PCT Pub. Date: Oct. 13, 2016

(65) Prior Publication Data
US 2018/0115408 A1    Apr. 26, 2018

(30) Foreign Application Priority Data

Apr. 7, 2015  (EP) .................................... 15162665

(51) Int. Cl.
*H04B 10/08*  (2006.01)
*H04L 7/00*   (2006.01)
(Continued)

(52) U.S. Cl.
CPC ....... *H04L 7/0075* (2013.01); *H04B 10/0775* (2013.01); *H04B 10/1149* (2013.01); *H04L 7/0041* (2013.01)

(58) Field of Classification Search
CPC . H04L 7/0075; H04L 7/0041; H04B 10/0775; H04B 10/1149
(Continued)

(56) References Cited

U.S. PATENT DOCUMENTS

| | | | |
|---|---|---|---|
| 5,297,144 A | 3/1994 | Gilbert et al. | |
| 2012/0050456 A1* | 3/2012 | Arnao | H04N 7/152 348/14.12 |
| 2014/0321860 A1 | 10/2014 | Kido et al. | |

FOREIGN PATENT DOCUMENTS

| | | |
|---|---|---|
| EP | 0196347 A1 | 10/1986 |
| KR | 20120030615 A | 3/2012 |
| WO | 9515624 | 6/1995 |

OTHER PUBLICATIONS

Extended European Search Report for Application No. 15162665.2 (filed Apr. 7, 2015), dated Oct. 10, 2015.

* cited by examiner

Primary Examiner — Mohammad R Sedighian

(57) ABSTRACT

The present invention pertains to a method for configuring an infrared audio transmission system comprising a signal generator and a plurality of radiators connected to said signal generator, the method comprising at least one of said plurality of radiators: receiving (1050) a delay compensation configuration message; and storing (1060) an amount of delay to be introduced into subsequently radiated signals in accordance with the received delay compensation configuration message. The invention also pertains to a configuration node (100) for configuring radiators in such a system, configured to: transmit (1010) at least one test signal to the radiators; detect (1020) events triggered by the test signal; determine (1030) respective transmission delays between the node and the radiators on the basis of these reflections; and transmit (1040) a delay compensation configuration (Continued)

message over said network, the delays being included in the delay compensation configuration message.

11 Claims, 3 Drawing Sheets

(51) Int. Cl.
 *H04B 10/114* (2013.01)
 *H04B 10/077* (2013.01)
(58) Field of Classification Search
 USPC .......................................... 398/16, 161, 102
 See application file for complete search history.

METHOD FOR CONFIGURING AN INFRARED AUDIO TRANSMISSION SYSTEM AND APPARATUS FOR USING IT

CROSS-REFERENCE TO RELATED APPLICATIONS

The present application claims the benefit of and the priority to European patent application EP 15 162 665 filed on 7 Apr. 2015 with the European Patent Office. The content of European patent application EP 15 162 665 is incorporated herein by reference for all purposes in its entirety including all tables, figures, and claims—as well as including an incorporation of any element or part of the description, claims or drawings not contained herein and referred to in Rule 20.5(a) of the PCT, pursuant to Rule 4.18 of the PCT.

FIELD OF THE INVENTION

The present invention pertains to methods and systems for transmitting audio signals over frequency modulated infrared bands. Such systems are used for example at conferences, exhibitions, guided tours, and the like.

BACKGROUND

DE 2431937 A1 in the name of Sennheiser Electronic KG describes the use of multi-channel infrared transmission of audio feeds in different languages from interpreters at a conference to receivers in headsets worn by conference delegates.

International standard IEC 61603-7, entitled "Transmission systems of audio and/or video and related signals using infra-red radiation—Part 7: Digital audio signals for conference and similar applications", describes the characteristics of a digital multiple channel, multiple carrier audio transmission system as an extension to conference interpretation or similar systems using the frequency ranges 45 kHz to 1 MHz and 2 MHz to 6 MHz.

Known systems include a signal generator, sometimes referred to as the transmitter, which provides a modulated signal to one or more radiators. The radiators transmit the signals supplied by the signal generator as an optical signal, in particular in the form of infrared radiation. In order to cover large spaces with an adequate infrared signal, multiple radiators have to be used. Radiators are typically connected to the signal generator in a daisy-chained configuration.

It is a disadvantage of the known systems that, when multiple radiators are used, these radiators must be manually configured to introduce an artificial delay so as to synchronize the infrared signal of the different radiators, with different positions in the daisy-chain. Manual configuration of a radiator requires access to the radiator's control panel, which is difficult to reach once the radiator is mounted in its operational position (usually at great height on a wall).

It is a purpose of embodiments of the present invention to at least partially avoid this disadvantage.

SUMMARY OF THE INVENTION

According to an aspect of the present invention, there is provided a method for configuring an infrared audio transmission system comprising a signal generator and a plurality of radiators connected to the signal generator by a network, the method comprising at least one of the plurality of radiators:

receiving a delay compensation configuration message over the network; and storing an amount of delay to be introduced into subsequently radiated signals in accordance with the received delay compensation configuration message.

It is an advantage of the invention that manual configuration of the radiators can be avoided.

In an embodiment, the method according to the present invention further comprises at a node of the network: transmitting at least one test signal to the plurality of radiators over the network; detecting an event triggered by the at least one test signal; and determining respective transmission delays between the node and the radiators on the basis of the event, the respective transmission delays being included in the delay compensation configuration message.

It is an advantage of this embodiment that the delay compensation values don't have to be estimated or calculated by a technician, but can be automatically determined on the basis of an automated signal-response analysis.

In a particular embodiment, the detecting of the event comprises detecting a response transmitted by at least one of the plurality of radiators.

In this embodiment, the radiators include logic that recognize the test signal, and send a predetermined response within a certain delay after receiving the test signal.

In a particular embodiment, the detecting of the event comprises detecting reflections of the at least one test signal.

It is an advantage of this embodiment that the radiators don't have to actively respond to the test signal, which could introduce a variable additional delay. Instead, a change of impedance in the transmission medium, which is present at the transmission line/radiator interface, causes a partial reflection of the electromagnetic test signal, which reflection can be detected and timed to determine the amount of delay of the tested segment by means of known time-domain reflectometry techniques.

In a particular embodiment, the radiators are connected to the network in a daisy-chain or ring architecture by means of respective network interfaces, and the method further comprises selectively changing an impedance of the respective network interfaces prior to the transmitting of the at least one test signal.

It is an advantage of this embodiment that the delay of the various segments can be more accurately determined, by measuring reflections in consecutive steps.

In an embodiment of the method according to the present invention, the radiators are connected to the network in a daisy-chain architecture by means of respective upstream and downstream network interfaces, and the method further comprises: deactivating the downstream interfaces at all of the radiators prior to the transmitting of the at least one test signal; activating the respective downstream interface of a first one of the radiators after a predetermined time following receipt of a first test signal; activating the respective downstream interface of subsequent ones of the radiators after a predetermined time following receipt of a subsequent test signal; and at each one of the radiators, deriving a relative position of the one of the radiators in the daisy-chain from a total time lapsed until receipt of the respective test signal.

It is an advantage of this embodiment that the delay of the various segments can be more accurately determined, by measuring the segments in consecutive steps. Additionally, this embodiment allows the radiators to determine their respective positions in the chain. This effect can advantageously be obtained even in situations where there is no communication from the radiators to the signal generator (i.e., no uplink). Given that the radiators know their respective positions, the delay configuration message(s) can be formatted in a simplified way; it suffices that the required delay compensation values are provided for the various positions in the chain.

In an embodiment, the method according to the present invention further comprises at the plurality of radiators: transmitting infrared signals representing a set of audio channels, the infrared signals being delayed by the stored amount of delay.

This embodiment includes the operational stage of the radiators' functioning.

According to an aspect of the present invention, there is provided a computer program product comprising code means configured to cause a processor to carry out the method as described above.

According to an aspect of the present invention, there is provided a configuration node for configuring radiators in an infrared audio transmission system connected to the configuration node by a network, the configuration node being configured to: transmit at least one test signal to the plurality of radiators over the network; detect events triggered by the at least one test signal; determine respective transmission delays between the node and the radiators on the basis of the reflections; and transmit a delay compensation configuration message over the network, the respective transmission delays being included in the delay compensation configuration message.

In an embodiment, the configuration node according to the present invention is further configured to adapt the transmission delays to be transmitted in the delay compensation configuration message to combine the effect of a plurality of branches of radiators in respective daisy-chain configurations.

This embodiment is based on the insight of the inventors that measured delay lines per branch need to be combined to obtain the overall delay line measurement. It is an advantage of this embodiment that by merging the delay measurement for different daisy-chained branches, the radiators within each branch are not only synchronized between themselves, but also relative to the radiators in other branches.

According to an aspect of the present invention, there is provided a radiator for use in an infrared audio transmission system comprising a signal generator connectable to the radiator by a network, the radiator being configured to: receive a delay compensation configuration message over the network; and store an amount of delay to be introduced into subsequently radiated signals in accordance with the received delay compensation configuration message.

The technical effects and advantages of embodiments of the computer program product, the configuration node and the radiator of the present invention correspond, mutatis mutandis, to those of the corresponding embodiments of the method according to the present invention.

BRIEF DESCRIPTION OF THE DRAWINGS

These and other features and advantages of embodiments of the present invention will now be described in more detail with reference to the accompanying drawings, in which.

DESCRIPTION OF EMBODIMENTS

Figure 1:
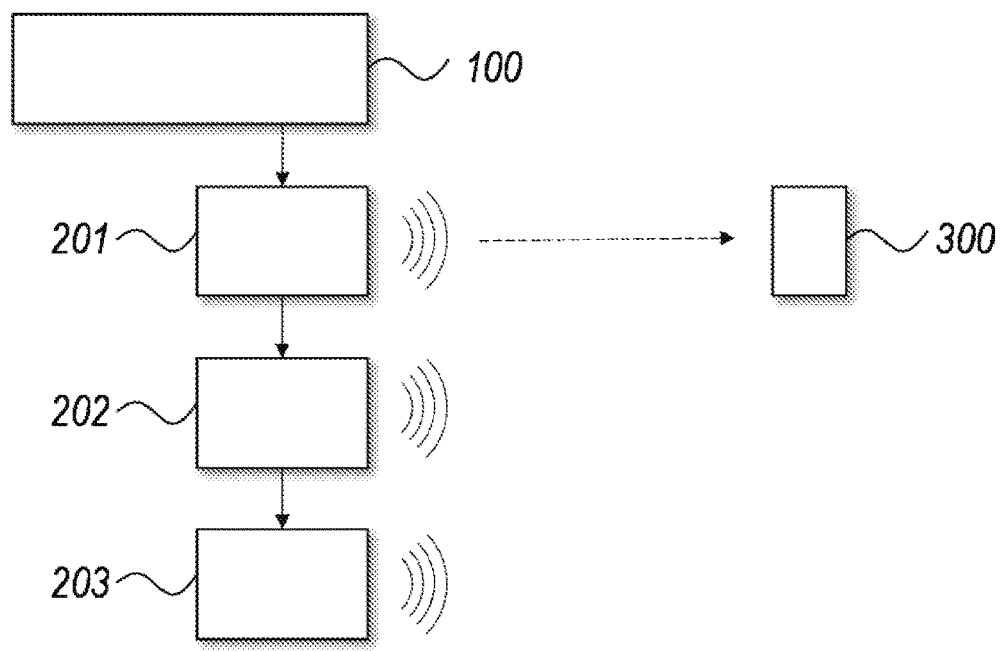
FIG. 1 schematically represents a conferencing system according to an embodiment of the present invention, the system including a signal generator, a plurality of radiators, and a plurality of receivers.

FIG. 1 schematically represents a conferencing system according to an embodiment of the present invention. The system includes a signal generator 100, sometimes referred to as the transmitter, which provides a modulated signal to one or more radiators. In order to cover large spaces with an adequate infrared signal, multiple radiators have to be used. Radiators are typically connected to the signal generator in a daisy-chained configuration; such an open chain is illustrated in FIG. 1.

Without loss of generality, three radiators 201-203 are shown in the figure. In practice, a larger number of radiators may be used, up to approximately 20. The radiators 201-203 transmit the signals supplied by the signal generator 100 as an optical signal, in particular in the form of infrared radiation. To avoid interference, the signals emitted by the various radiators have to be synchronized. This requires compensation of the delay introduced by the transmission lines connecting the various radiators in the chain. According to embodiments of the present invention, the delay compensation values may be automatically determined. According to the invention, the radiators are remotely configured with the appropriate delay compensation values.

The signal transmitted by the radiators is received by handheld receivers, carried by the conference delegates. To simplify the figure, only a single exemplary receiver 300 is shown in the figure. The illustrated receiver 300 has an infrared transceiver for receiving the audio signals that are distributed in the modulated infrared signals.

The wirelessly distributed audio signals may be audio signals such as those transmitted at conferences, exhibitions, guided tours, and the like. In particular, these may be multi-channel transmissions of the same text as translated or interpreted in different languages, modulated by means of any method (e.g., separate FM-modulated frequency bands). The channels may comprise uncompressed or compressed, analog or digital signals, and may include data, control and/or management signals in addition to the audio information.

The receiver 300 is typically a handheld device. The term handheld is used to designate a general shape, size, and weight that would allow holding the device in one's hand; this does not exclude embodiments whose design is optimized for other means of carrying, such as devices with belt clips, lanyards, bracelets, etc.

According to the invention, a plurality of audio channels are transmitted over frequency modulated infrared bands.

A configuration node according to an embodiment of the present invention may be included in the signal generator 100. The configuration node is used for configuring the radiators 201-203. The configuration node is configured to transmit at least one test signal to the plurality of radiators over the network; detect events triggered by the at least one test signal; determine respective transmission delays between the node and the radiators on the basis of the reflections; and transmit a delay compensation configuration message over the network, the respective transmission delays being included in the delay compensation configuration message.

The radiators 201-203 are configured to: receive a delay compensation configuration message over the network; and store an amount of delay to be introduced into subsequently radiated signals in accordance with the received delay compensation configuration message.

The functions of the configuration node and the radiators that pertain to the delay compensation configuration may be implemented in dedicated hardware (e.g., ASIC), configurable hardware (e.g., FPGA), programmable components (e.g., a DSP or general purpose processor with appropriate software), or any combination thereof. The same component(s) may also include other functions.

Figure 2:
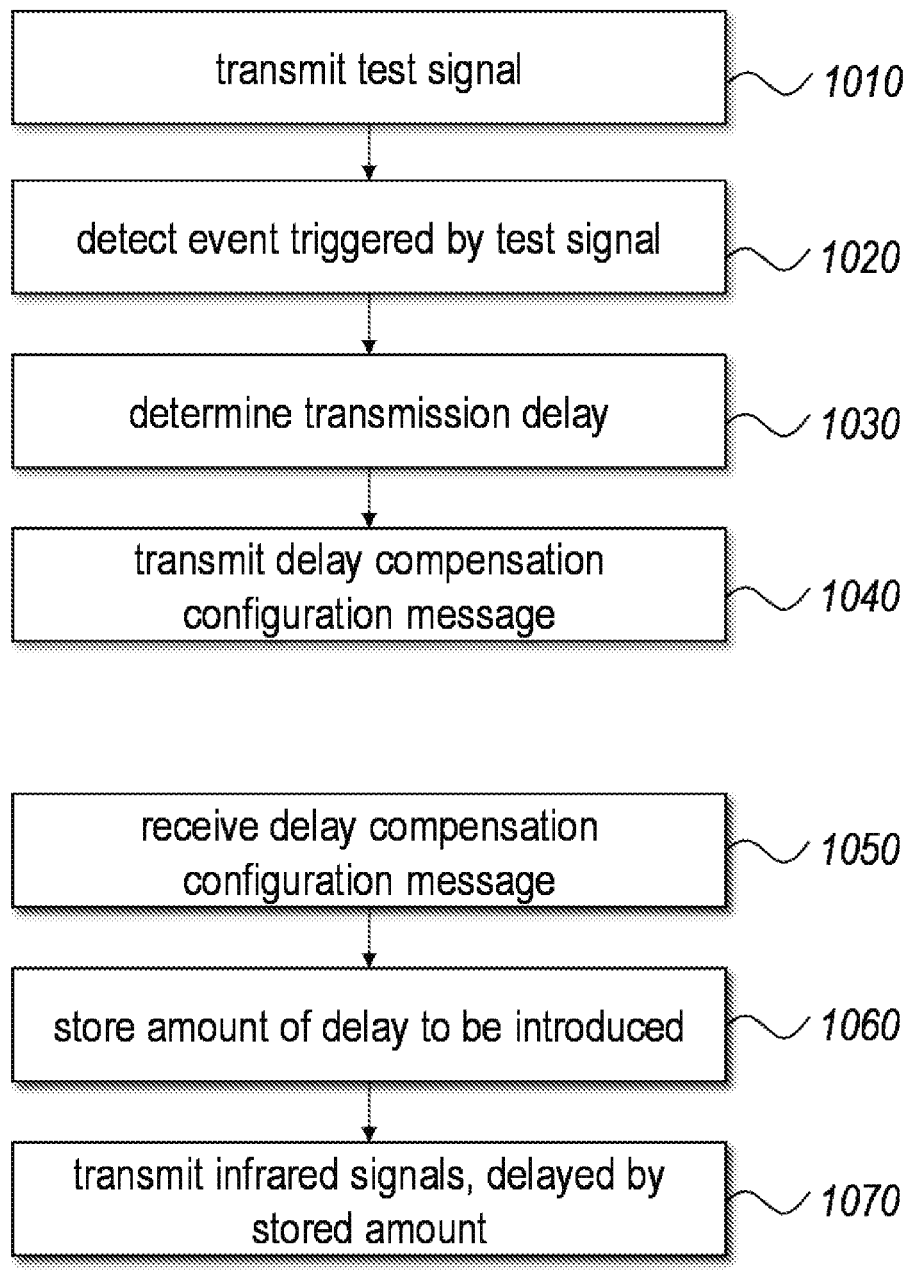
FIG. 2 provides flow charts of steps of methods according to embodiments of the present invention.

FIG. 2 provides flow charts of steps of methods according to embodiments of the present invention.

The top part of the flow chart illustrates steps carried out by a configuration node, in an elementary embodiment of the present invention. In a first step 1010, the configuration node transmits a test signal. In a subsequent step 1020, the configuration node detects an event triggered by the test signal. This event may be a physical reflection of the test signal caused by a change in impedance at the location of the radiators, or a message actively transmitted by one of the radiators in response to the test message. In a third step 1030, the configuration node determines the associated transmission delay (for instance by using known time-domain reflectometry techniques) and calculates the required delay compensation values to synchronize the transmissions of the radiators. In a final step 1040, the configuration node transmits one or more delay compensation configuration messages to configure the radiators accordingly.

The bottom part of the flow chart illustrates steps carried out by a radiator, in an elementary embodiment of the present invention. In a first step 1050, the radiator receives the delay compensation configuration message described above. The amount of delay requested by that delay compensation configuration message for that particular radiator is stored in the radiator in the next step 1060. Finally, once the radiators are in normal operation mode 1070, all transmissions of infrared signals are preceded by the required compensatory delay, as previously stored.

Figure 3:
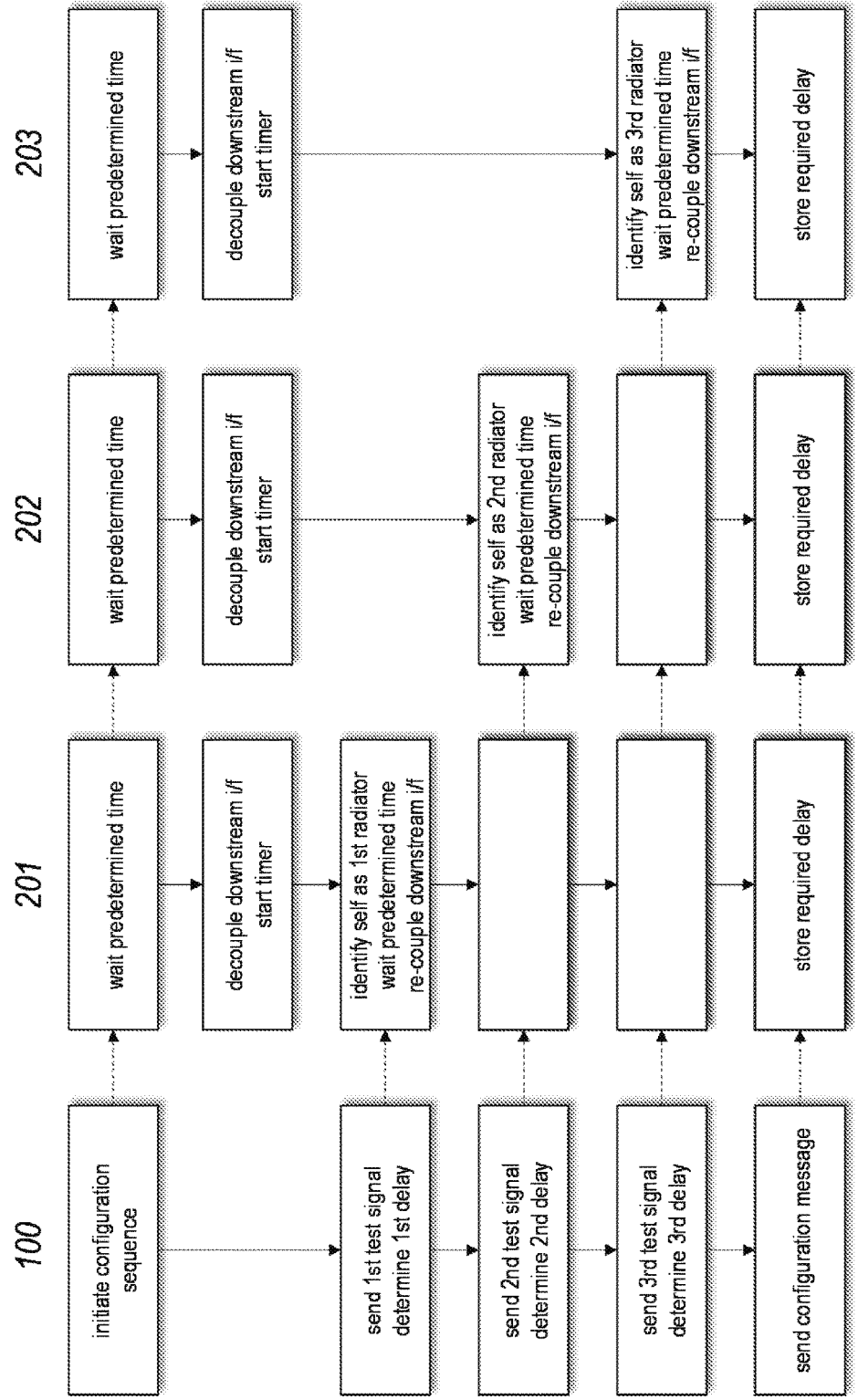
FIG. 3 provides a combined flow and signal chart representing an embodiment of the method according to the present invention.

FIG. 3 provides a combined flow and signal chart representing an embodiment of the method according to the present invention. The actions performed at different entities are shown in distinct columns. Time flows from the top of the chart to the bottom. The sequence of events is represented by solid arrows, while dotted arrows are used to indicate a message flow. The open daisy-chain topology of FIG. 1 is assumed, wherein upstream links (from one radiator to the next in the direction away from the signal generator) may be selectively disabled.

At a first stage, the configuration node 100 initiates the configuration sequence by transmitting an initial message which is transmitted along the daisy chain to radiators 201, 202, and 203. Upon receipt of this message, each radiator disconnects its downstream interface (this is preferably done after a short delay, so as to allow the initiation message to propagate). The radiators then start keeping track of time.

The initial message may be sent as a data packet, the structure of which can be recognized by the recipient, and the content of which can be parsed so as to extract an instruction to the effect that the downstream interfaces shall be disconnected and time tracking shall commence, as explained above. Additionally or alternatively, the initial message may be sent as a predetermined signal consisting of a variation of voltage levels on the line, or another recognizable modulated pattern.

At the next stage, after a first predetermined delay, the configuration node 100 transmits a first test signal which is transmitted along the daisy chain to radiator 201 only, as all further downstream radiators have been decoupled. Radiator 201 is the only radiator that receives the first test signal within the predetermined time interval, and on this basis it can determine that it is the first radiator in the chain. Subsequently, radiator 201 reactivates its downstream interface. Radiator 201 either passively reflects or actively replies to the test signal, to allow the configuration node 100 to measure the round-trip delay, and to determine an appropriate delay compensation value accordingly.

At the next stage, after a second predetermined delay, the configuration node 100 transmits a second test signal which is transmitted along the daisy chain to radiators 201 and 202, as all further downstream radiators have been decoupled. Radiator 202 is the only radiator that receives the second test signal as a first signal within the predetermined time interval, and on this basis it can determine that it is the second radiator in the chain. Subsequently, radiator 202 reactivates its downstream interface. Radiator 202 either passively reflects or actively replies to the test signal, to allow the configuration node 100 to measure the round-trip delay, and to determine an appropriate delay compensation value accordingly.

At the next stage, after a third predetermined delay, the configuration node 100 transmits a third test signal which is transmitted along the daisy chain to radiators 201, 202, and 203, as all further downstream radiators have been decoupled. Radiator 203 is the only radiator that receives the third test signal as a first signal within the predetermined time interval, and on this basis it can determine that it is the third radiator in the chain. Subsequently, radiator 203 reactivates its downstream interface. Radiator 203 either passively reflects or actively replies to the test signal, to allow the configuration node 100 to measure the round-trip delay, and to determine an appropriate delay compensation value accordingly.

If the configuration node 100 continues to send out test signals, it will soon notice that no new reflections/reactions are detected, and that its view of the topology of the radiators' network is therefore complete. At that point, the configuration node 100 can send the appropriate delay compensation values to the various radiators as described above, and the system can turn to normal operation.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

What is claimed:

1. A method for configuring an infrared audio transmission system comprising a signal generator and a plurality of radiators connected to said signal generator by a network, the method comprising at at least one of said plurality of radiators:

during a configuration mode, receiving at least one test signal from the signal generator;

during said configuration mode, receiving a delay compensation configuration message over said network; and during said configuration mode, storing an amount of delay to be introduced into signals subsequently radiated during a normal operation mode in accordance with said received delay compensation configuration message.

2. The method according to claim 1, further comprising at a node of said network:

transmitting said at least one test signal to said plurality of radiators over said network;

detecting an event triggered by said at least one test signal; and determining respective transmission delays between said node and said radiators on the basis of said event, said respective transmission delays being included in said delay compensation configuration message.

3. The method according to claim 2, wherein said detecting of said event comprises detecting a response transmitted by at least one of said plurality of radiators.

4. The method according to claim 2, wherein said detecting of said event comprises detecting reflections of said at least one test signal.

5. The method according to claim 4, wherein said radiators are connected to said network in a daisy-chain or ring architecture by means of respective network interfaces, the method further comprising selectively changing an impedance of said respective network interfaces prior to said transmitting of said at least one test signal.

6. The method according to claim 1, wherein said radiators are connected to said network in a daisy-chain architecture by means of respective upstream and downstream network interfaces, the method further comprising:

deactivating the downstream interfaces at all of said radiators prior to said receiving of said at least one test signal;

activating the respective downstream interface of a first one of said radiators after a predetermined time following receipt of a first test signal;

activating the respective downstream interface of subsequent ones of said radiators after a predetermined time following receipt of a subsequent test signal; and at each one of said radiators, deriving a relative position of said one of said radiators in said daisy-chain from a total time lapsed until receipt of the respective test signal.

7. The method according to claim 1, further comprising at said plurality of radiators:

during said normal operation mode, transmitting infrared signals representing a set of audio channels, said infrared signals being delayed by said stored amount of delay.

8. A non-transitory computer program product comprising code means configured to cause a processor to carry out the method of claim 1.

9. A configuration node for configuring radiators in an infrared audio transmission system connected to said configuration node by a network, the configuration node being configured to:

transmit at least one test signal to said plurality of radiators over said network;

detect events triggered by said at least one test signal;

determine respective transmission delays between said node and said radiators on the basis of said events; and transmit a delay compensation configuration message over said network, said respective transmission delays being included in said delay compensation configuration message.

10. The configuration node according to claim 9, further configured to adapt said transmission delays to be transmitted in said delay compensation configuration message to combine the effect of a plurality of branches of radiators in respective daisy-chain configurations.

11. A radiator for use in an infrared audio transmission system comprising a signal generator connectable to said radiator by a network, the radiator being configured to:

during a configuration mode, receive at least one test signal from the signal generator;

during said configuration mode, receive a delay compensation configuration message over said network; and during said configuration mode, store an amount of delay to be introduced into signals subsequently radiated during a normal operation mode in accordance with said received delay compensation configuration message.

* * * * *